United States Patent
Amsler et al.

(10) Patent No.: US 10,522,960 B2
(45) Date of Patent: Dec. 31, 2019

(54) CRIMP QUALITY MONITORING METHOD AND SYSTEM FOR USE WITH A HYDRAULIC CRIMPING APPARATUS

(71) Applicant: TE CONNECTIVITY CORPORATION, Berwyn, PA (US)

(72) Inventors: Valerie Lynn Amsler, Mt. Wolf, PA (US); Miguel Alberto Berna-Inzua, Middletown, PA (US); Daniel Seabra Lopes, Chambersburg, PA (US); Matthew Steven Houser, Jonestown, PA (US); Thomas Edward Palmer, Middletown, MD (US); Ian Matthias Barnes, Enola, PA (US)

(73) Assignee: TE Connectivity Corporation, Berwyn, PA (US)

( * ) Notice: Subject to any disclaimer, the term of this patent is extended or adjusted under 35 U.S.C. 154(b) by 89 days.

(21) Appl. No.: 15/585,730

(22) Filed: May 3, 2017

(65) Prior Publication Data
US 2018/0323565 A1  Nov. 8, 2018

(51) Int. Cl.
| | | |
|---|---|---|
| *H01R 43/048* | (2006.01) | |
| *G01F 1/56* | (2006.01) | |
| *G01L 9/00* | (2006.01) | |
| *G01L 19/00* | (2006.01) | |
| *G01F 1/05* | (2006.01) | |
| *B30B 15/16* | (2006.01) | |

(52) U.S. Cl.
CPC ......... *H01R 43/0486* (2013.01); *B30B 15/16* (2013.01); *G01F 1/05* (2013.01); *G01F 1/56* (2013.01); *G01L 9/0051* (2013.01); *G01L 19/0092* (2013.01); *H01R 43/0488* (2013.01)

(58) Field of Classification Search
CPC .. H01R 43/04; H01R 43/048; H01R 43/0486; G01L 9/0051; G01L 19/0092; G01F 1/05; G01F 1/56; F15B 19/00; F15B 19/005

USPC ............. 73/168, 198, 715, 723, 726, 865.9; 439/442, 878

See application file for complete search history.

(56) References Cited

U.S. PATENT DOCUMENTS

| | | | |
|---|---|---|---|
| 603,909 | A | 5/1898 | Lord |
| 4,856,186 | A | 8/1989 | Yeomans |
| 4,916,810 | A | 4/1990 | Yeomans |
| 5,092,026 | A | 3/1992 | Klemmer et al. |
| 5,101,651 | A | 4/1992 | Veomans |

(Continued)

FOREIGN PATENT DOCUMENTS

| | | |
|---|---|---|
| CN | 104632766 A | 5/2015 |
| JP | H11345670 A | 12/1999 |

(Continued)

OTHER PUBLICATIONS

European Search Report, International Application No. 18170108.7-1201, European Filing Date Oct. 5, 2018.

*Primary Examiner* — Benjamin R Schmitt

(57) ABSTRACT

A method and system of monitoring crimp quality of a crimp terminal in a hydraulic crimping apparatus. The method includes: determining a pressure of a hydraulic fluid supplied to a hydraulic crimping head of the hydraulic crimping apparatus; determining a flow of the hydraulic fluid supplied to the hydraulic crimping head of the hydraulic crimping apparatus; and analyzing the pressure and the flow of the hydraulic fluid to determine if a crimp is defective or not defective.

13 Claims, 7 Drawing Sheets

(56) References Cited

U.S. PATENT DOCUMENTS

| | | | |
|---|---|---|---|
| 5,113,679 A * | 5/1992 | Ferraro | F15B 15/2853 |
| | | | 72/19.9 |
| 5,123,165 A | 6/1992 | Strong et al. | |
| 5,197,186 A | 3/1993 | Strong et al. | |
| 5,212,924 A | 5/1993 | Finkelstein | |
| 5,271,254 A | 12/1993 | Gloe et al. | |
| 5,375,341 A | 12/1994 | College et al. | |
| 5,491,994 A | 2/1996 | Baldyga | |
| 5,570,514 A | 11/1996 | Hashimoto et al. | |
| 5,841,675 A | 11/1998 | Ngo | |
| 5,937,505 A | 8/1999 | Strong et al. | |
| 6,161,407 A | 12/2000 | Meisser | |
| 7,024,752 B2 | 4/2006 | Imgrut et al. | |
| 7,140,215 B2 | 11/2006 | Viviroli et al. | |
| 7,216,519 B1 | 5/2007 | Ngo et al. | |
| 7,333,906 B2 | 2/2008 | Reeve et al. | |
| 7,587,918 B2 | 9/2009 | Imgrut | |
| 7,603,768 B2 | 10/2009 | Viviroli | |
| 2005/0005672 A1 * | 1/2005 | Sneath | B25B 27/10 |
| | | | 72/453.16 |
| 2010/0139351 A1 | 6/2010 | Bruhin | |
| 2012/0029775 A1 * | 2/2012 | Peters | B23K 9/1006 |
| | | | 701/50 |
| 2016/0363510 A1 * | 12/2016 | Kanack | B25B 27/10 |

FOREIGN PATENT DOCUMENTS

| | | |
|---|---|---|
| WO | 03050923 A1 | 6/2003 |
| WO | 2010120373 A2 | 10/2010 |

\* cited by examiner

CRIMP QUALITY MONITORING METHOD AND SYSTEM FOR USE WITH A HYDRAULIC CRIMPING APPARATUS

FIELD OF THE INVENTION

The subject matter herein relates generally to a crimp quality monitoring method and system for monitoring the crimp quality of a hydraulic crimping apparatus.

BACKGROUND OF THE INVENTION

Electrical terminals are typically crimped onto wires by a crimping apparatus to form a lead. The crimping apparatus has crimp tooling made up of a first part mounted to a base for supporting the electrical terminal and a second part mounted to a ram that is movable toward and away from the base for effecting the crimp. In operation, the terminal is placed on the first part of the crimp tooling and an end of a wire is inserted into the ferrule or barrel of the terminal. The ram is caused to move toward the base through a crimp stroke, thereby crimping the terminal onto the wire.

Systems have been developed that monitor the quality of the crimps for non-hydraulic crimping apparatus. When a defective crimp is detected, the lead is discarded. Some known crimp quality monitoring systems measure crimp quality by measuring crimp height. Ordinarily, if a terminal is not crimped to the correct crimp height for the particular terminal and wire combination, an unsatisfactory crimp connection will result. However, many unsatisfactorily crimp connections will, nevertheless, exhibit a "correct" crimp height. As such, systems that monitor crimp quality based on crimp height may pass defective leads from the crimping apparatus. Additionally, a crimp height variance or other physical variation in the crimped terminal is not, in and of itself, the cause of a defective crimp connection, but rather, may be indicative of another factor which causes the poor connection. Such factors include using the wrong terminal or wire size, missing strands of wire, short brush, insulation in the crimp, abnormal position of the terminal, wrong wire type, incorrect stripping of insulation and the like. Since such defective crimp connections frequently have the appearance of high-quality crimp connections, it is difficult to identify these defects in order that timely corrective action may be taken.

Other known crimp quality monitoring systems detect a defectively crimped terminal by analyzing the crimping forces imposed on the terminal during the actual crimping operation. For example, the systems collect force and displacement data during the crimp stroke and compare that data with normalized data collected from known good crimps during a learning phase. Such comparison is utilized to determine whether a particular crimp meets acceptable standards. However, crimp quality monitoring systems that monitor crimp quality based on force profiles are not without problems. The systems are inaccurate at measuring certain types of defective crimps. For example, the systems are susceptible to incorrectly identifying crimps having insulation in the barrel as being good crimps. The systems also are susceptible to falsely identifying some good crimps as being defective.

While many of the known systems are useful with electric and pneumatic crimping apparatus, such known systems do not properly measure the crimp quality of crimps made with the hydraulic crimping apparatus.

A need remains for a crimp quality monitoring system that may be used to accurately monitor the crimp quality for large gauge terminals that require the use of a hydraulic crimping apparatus to properly crimp the terminals. A need also remains for a crimp quality monitoring system that may be used to identify the particular defect with the crimp made using the hydraulic crimping apparatus.

SUMMARY OF THE INVENTION

An embodiment is directed to a method of monitoring crimp quality of a crimp terminal in a hydraulic crimping apparatus. The method includes: determining a pressure of a hydraulic fluid supplied to a hydraulic crimping head of the hydraulic crimping apparatus; determining a flow of the hydraulic fluid supplied to the hydraulic crimping head of the hydraulic crimping apparatus; and analyzing the pressure and the flow of the hydraulic fluid to determine if a crimp is defective or not defective.

An embodiment is directed to a method of monitoring crimp quality in a hydraulic crimping apparatus. The method includes: measuring a pressure of a hydraulic fluid supplied to a hydraulic crimping head of the hydraulic crimping apparatus; providing the measured pressure of the hydraulic fluid to a controller; measuring a flow of the hydraulic fluid supplied to the hydraulic crimping head of the hydraulic crimping apparatus; providing the measured flow of the hydraulic fluid to the controller; and analyzing the pressure and the flow of the hydraulic fluid to determine if a crimp is defective.

An embodiment is directed to a method of monitoring crimp quality of a crimp terminal in a hydraulic crimping apparatus. The method includes measuring: a) a pressure of a hydraulic fluid in a hydraulic system supplied to a hydraulic crimping head of the hydraulic crimping apparatus; or b) a flow rate of the hydraulic fluid supplied in the hydraulic system to the hydraulic crimping head of the hydraulic crimping apparatus; or c) the time required to move the hydraulic crimping head from a first position to a second position; or d) any combination of a), b) or c). The method also includes analyzing the measured pressure, flow rate, time or any combination thereof to a respective pressure, flow rate or time to determine if a crimp is defective or not defective.

An embodiment is directed to a system for monitoring the crimp quality for a hydraulic crimping apparatus. The system includes a hydraulic pump, a pressure sensor, a flow sensor and a controller. The hydraulic pump is connected to crimp tooling. The pressure sensor is provided between the hydraulic pump and the crimp tooling. The pressure sensor monitors the pressure of the hydraulic fluid in the system. The flow sensor is provided between the hydraulic pump and the crimp tooling. The flow sensor monitors the flow of hydraulic fluid in the system. The controller analyzes the pressure of the hydraulic fluid provided by the pressure sensor and the flow of the hydraulic fluid provided by the flow sensor to determine if a crimp is defective.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
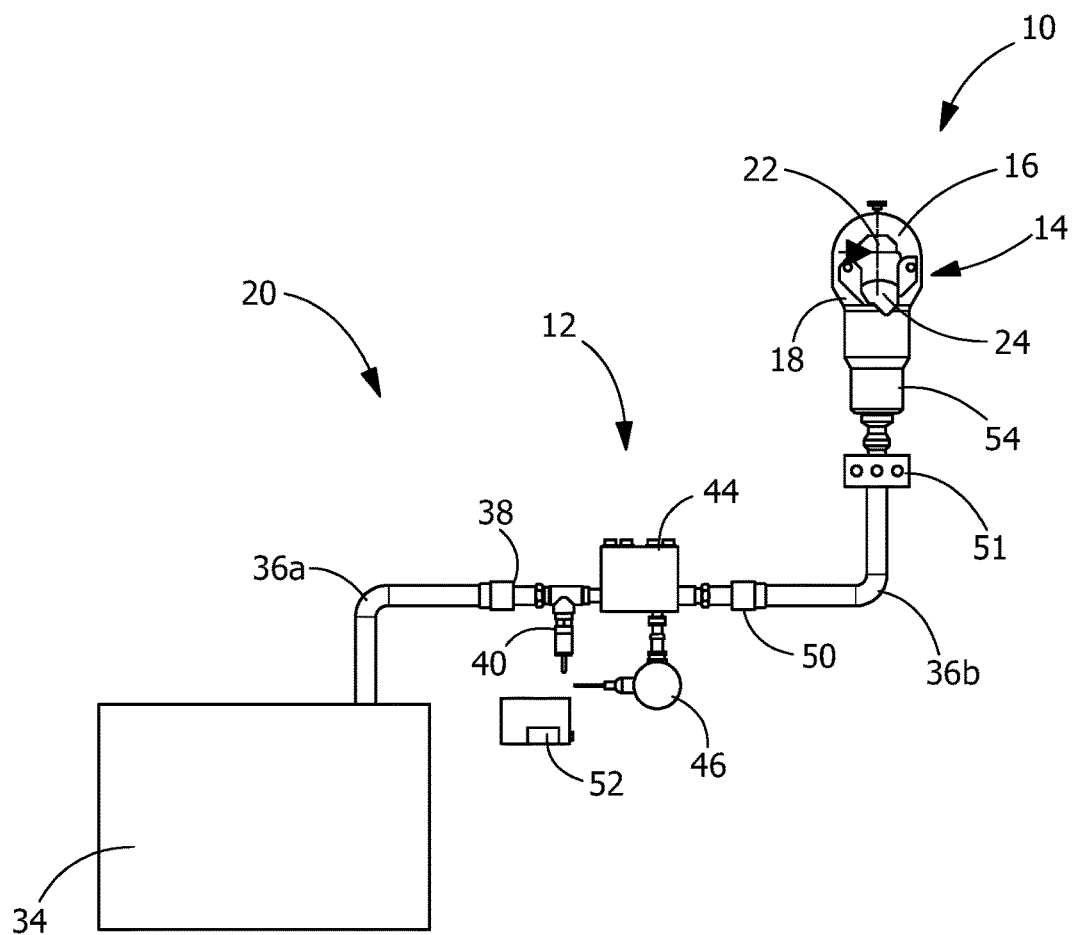
FIG. 1 illustrates an illustrative hydraulic crimping apparatus and a hydraulic delivery system with a crimp quality monitoring in accordance with an illustrative embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

FIG. 1 illustrates an exemplary crimping apparatus 10 having a crimp quality monitoring system 12 formed in accordance with an illustrative embodiment. The crimping apparatus 10 has a hydraulic head 14 with an upper portion 16 and a lower portion 18. The lower portion 18 receives hydraulic fluid therein from a hydraulic delivery system 20.

A first die half 22 is housed in the upper portion 16 of the hydraulic head 14. A second die half 24 is housed in the lower portion 18 of the hydraulic head 14. In the illustrative embodiment shown, the first die half represents a fixed component of the crimp tooling that is removably attached to the upper portion 16. The second die half represents a movable component of the crimp tooling and is removably attached to the lower portion 18.

Figure 2:
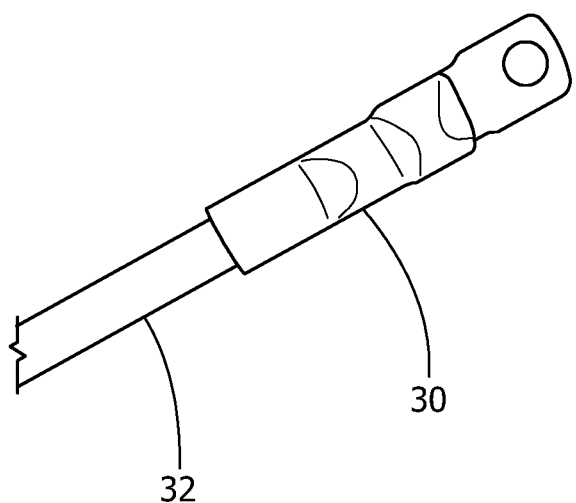
FIG. 2 illustrates an illustrative terminal crimped to a wire using the hydraulic crimping apparatus.

FIG. 2 shows a typical terminal 30 crimped onto a wire 32. Many different types and sizes of terminals 30 and wires 32 may be used with the crimping apparatus 10. The crimp tooling is used to terminate the terminal 30 to the wire 32. For example, the second die half 24 is hydraulically driven along a crimp stroke initially towards the first die half 22 and finally away from the first die half 22. During the initial part of the crimp stroke, the first and second die halves 22, 24 engage the terminal 30 and crimp the terminal 30 onto the wire 32.

Figure 3:
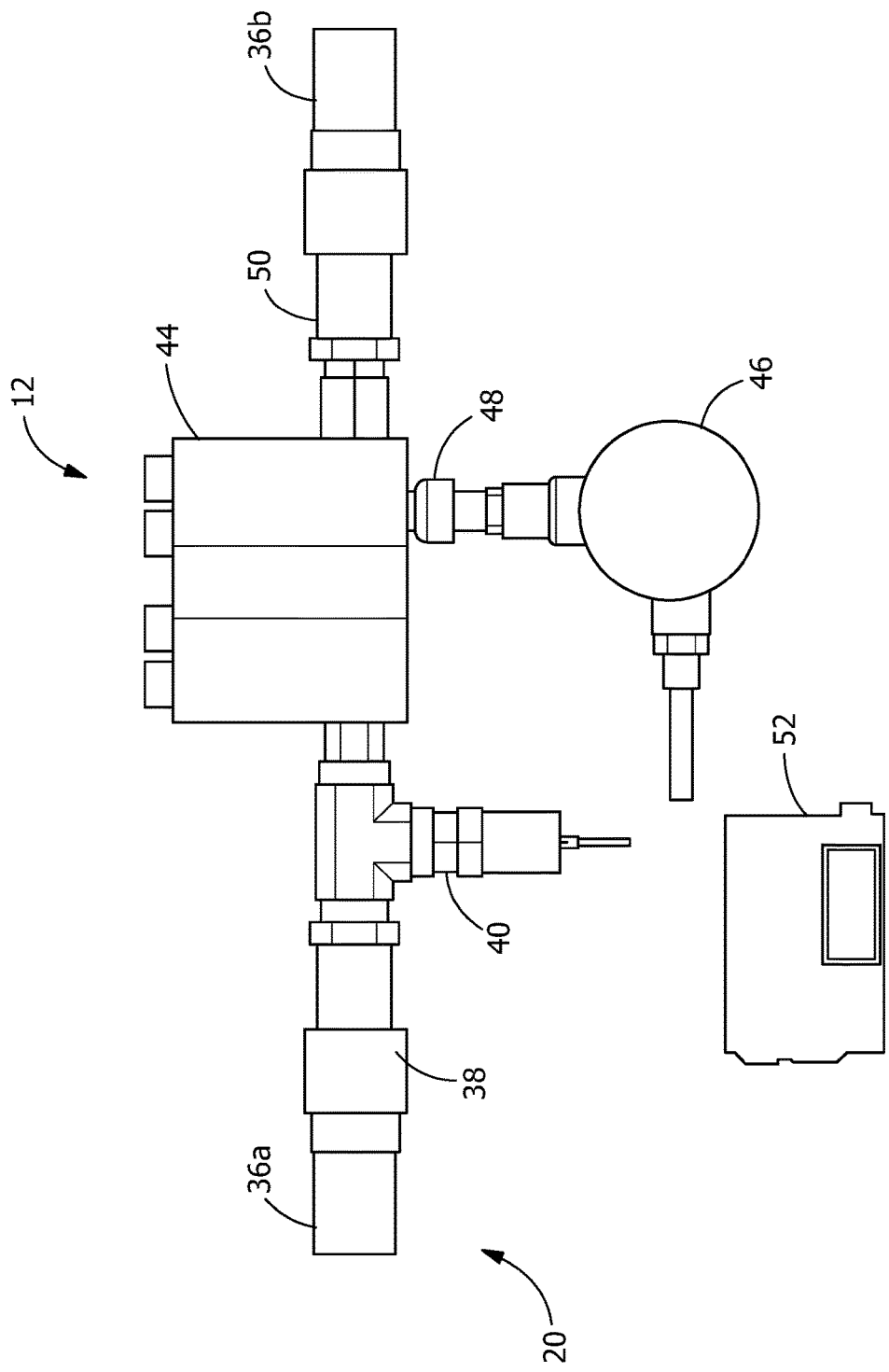
FIG. 3 is an enlarged view of a pressure sensor and a flow sensor provided in-line with the hydraulic delivery system.

As best shown in FIGS. 1 and 3, the hydraulic system 20 includes a hydraulic pump 34 which is fluidly connected to the hydraulic head 14 by a hose 36 or other type of conduit. The hose 36 may be separated into two or more components 36a, 36b to allow for various measuring devices to be positioned in-line with the flow of hydraulic fluid from the hydraulic pump 34 to the hydraulic head 14.

In the embodiment shown, hose 36a extends between the hydraulic pump 34 and a coupling member 38. The coupling member 38 is attached to a pressure transducer 40. In various embodiments, the hose 36a may have an inside diameter which is greater than the inside diameter of the pressure transducer 40. Therefore, the coupling member 38 may have a transition portion which reduces the inside diameter of the coupling member 38 to allow the coupling member 38 to properly mate to the hose 36a and the pressure transducer 40.

A flow meter 44 extends from the pressure transducer 40. A flow sensor 46 extends from the flow meter 44. In the illustrative embodiment shown, the flow sensor 46 is rotatably coupled to the flow meter 44 by a swivel coupler 48. A coupling member 50 extends between and secures the flow meter 44 to the hose 36b. The hose 36b extends between the flow meter 44 and the hydraulic head 14.

Hydraulic control 51 is provided in the hydraulic delivery system 20. In the embodiment shown, the hydraulic control 51 includes buttons which the operator engages to reset the system, initiate the flow of the hydraulic fluid and eject a defective terminal. However, other types of hydraulic controls, including, but not limited to, foot pedals may be used.

The pressure transducer 40 and flow sensor 46 send information to a controller or microprocessor 52. A wired or wireless electrical connection between the pressure transducer 40 and the controller 52 may be provided. Similarly, a wired or wireless electrical connection between the flow sensor 46 and the controller 52 may be provided.

The pressure transducer 40 is of the type the converts pressure into an analog electrical signal, such as, but not limited to, a strain-gage based transducer. The conversion of the pressure into an electrical signal is achieved by the physical deformation of strain gage which is bonded into the diaphragm of the pressure transducer and wired into a Wheatstone bridge configuration. Consequently, pressure applied to the pressure transducer produces a deflection of the diaphragm which introduces strain to the gage. This strain produces an electrical resistance change proportional to the pressure. As the hydraulic system 20 is a closed system and the hydraulic fluid is not compressible, the pressure in the hose 36 is proportional to the pressure applied to the second die half 18 of the hydraulic head 14, and proportion to the force applied to the terminal 30 and wire 32 being crimped. Therefore, the signal transmitted from the pressure transducer 40 to the controller 52 is indicative of the force imposed upon the terminal 30 during crimping.

The flow meter 44 is positioned or arranged to measure the flow of the hydraulic fluid through the hose 36. The flow meter is used to measure volumetric flow rate of the hydraulic fluid through the hose 36. As the hydraulic system 20 is a closed system and the hydraulic fluid is not compressible, the volume of fluid which passes through the hose 36 is directly proportional to the amount of fluid which enters or exists the hydraulic head 14. As the dimensions of the hydraulic receiving chamber 54 of the hydraulic head 14, which receives hydraulic fluid therein from the hydraulic delivery system 20, are known, any change in the volume of the fluid is directly proportional to a change in the displacement of the second die half 24. Therefore, the flow of hydraulic fluid through the hose 36 is directly proportional to the amount of displacement second die half 24 and the displacement of the terminal 30 during crimping. The flow sensor 46 registers the flow detected by the flow meter 44 and transmits the information to the controller 52.

In the illustrative embodiment shown, the pressure transducer 40, flow meter 44 and flow sensor 46 are shown in-line between the hydraulic pump 34 and the hydraulic head 14. However, in other illustrative embodiments, one or more of the pressure transducer 40, flow meter 44 and flow sensor 46 may be located in other positions, such as, but not limited to in the hydraulic pump 34. In addition, the pressure transducer 40, flow meter 44 and flow sensor 46 may be discrete devices or may be integrated into one or more device.

By monitoring the signals from the flow sensor 46 and the pressure transducer 40, the quality of the crimp may be monitored. For example, the crimp height of the crimped terminal 30 can be determined, such as by analyzing the signals from the flow sensor 46. Alternatively, the variation in the crimp height from a baseline may be determined for the crimped terminal 30. Additionally, by analyzing the signals from the pressure transducer 40, other characteristics of the crimp may be analyzed. For example, characteristics relating to the forces imported onto the terminal 30 may be analyzed. Force data may be gathered and used to determine crimp quality. For example, a force profile may be generated and analyzed, such as to analyze parameters like the peak force exerted on the terminal 30 and the amount of work performed to complete the crimp.

Figure 5:
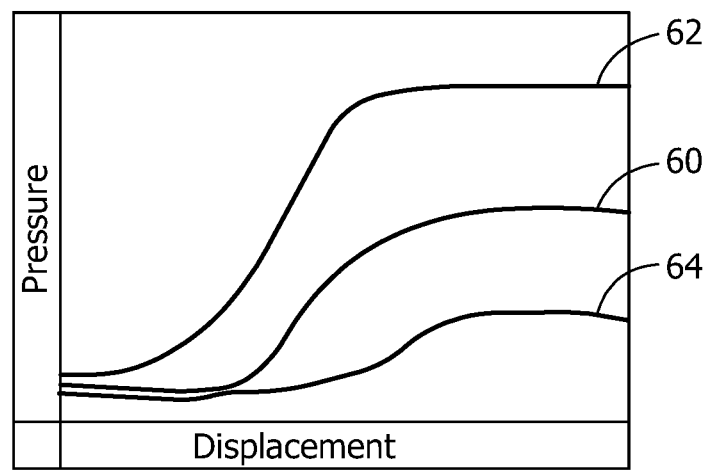
FIG. 5 is a graph showing an illustrative pressure displacement curve associated with the crimping of a terminal in the hydraulic crimping apparatus.

The controller or microprocessor 52 may have an internal memory or database for storing data, or alternatively, an external database or memory may be provided. The controller 52 gathers information from the pressure transducer 40 and flow sensor 46. The information is plotted on a graph as shown at 60 in FIG. 5. The controller 52 analyzes the plotted information and compares the plotted information to a first preferred or targeted crimping force envelope 62 and a second preferred or targeted crimping force envelope 64. If the plotted information 60 is positioned inside of area between the first preferred or target crimping force envelope 62 and the second preferred or target crimping force envelope 64, the controller 52 provides a visual output 66 to the operator to indicate that the terminal is properly crimped to the wires. If the plotted information 60 is positioned outside of area between the first preferred crimping force envelope 62 and the second preferred crimping force envelope 64, the controller 52 provides a visual output 68 to the operator to indicate that the terminal is not properly crimped to the wires. The operator may remove the improperly crimped terminal from production. Such visual output may include one or more of the following: an indication that the terminal is properly crimped; an indication that the terminal is not properly crimped; or an indication that the terminal maybe properly crimped, but a visual inspection by the operator is required.

The controller 52 may be used to drive various components of the crimping apparatus 10, such as an ejector (not shown), that discards leads that have terminals with poor quality crimps. The controller 52 may be used to drive the hydraulic delivery system 20 through the crimp stroke. The controller 52 may drive the components automatically as part of a control scheme or based on operator input and/or input from either the pressure transducer 40 or the flow sensor 46.

The crimp quality monitoring system 12 generally includes the controller 52, the pressure transducer 40 and the flow sensor 46. The crimp quality monitoring system 12 may include other components as well in alternative embodiments. Optionally, the controller 52 may be part of a computer. The controller 52 may have a microprocessor for processing the signals from the pressure transducer 40 and the flow sensor 46. The crimp quality monitoring system 12, using the controller 52, analyzes and/or manipulates the data from the pressure transducer 40 and the flow sensor 46 to monitor crimp quality.

The signal appearing on the pressure transducer 40, which is indicative of the force imposed upon the terminal 30, and the signal appearing on the flow sensor 46, which is indicative of the relative position of the mating halves of the hydraulic head 14, are monitored by the controller 52 and recorded. The signals may be recorded as pairs of data elements, one pair for each discrete increment of time during the crimping cycle. As such, each force unit is associated with a particular time component and a particular position component of the hydraulic head 14.

Figure 4:
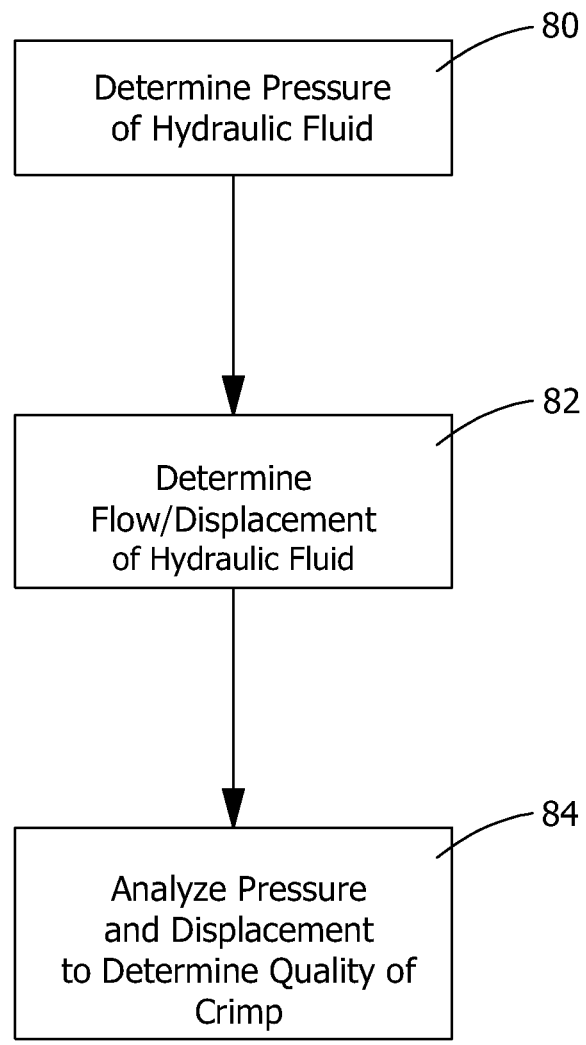
FIG. 4 is a flowchart illustrating an exemplary method of monitoring crimp quality using the crimp quality monitoring system shown in FIG. 1.

In an exemplary embodiment, as shown in FIG. 4, the pressure, which is proportional to the crimp force, is measured 80 during the crimp stroke by the pressure transducer 40. The flow or displacement, which is proportional to the displacement of the die, is measured 82 during the crimp stroke by the flow meter 44 and flow sensor 46.

The pressure and flow are measured continuously or at predetermined intervals based on either time or crimp tooling position. For example, a predetermined sample time may be selected, and the pressure and flow may be measured at each of the discrete sample times. Alternatively, or additionally, the pressure and flow may be measured when the crimp tooling is at a predetermined crimp height position. The position of the crimp tooling may be detected by the distance sensor (not shown).

Optionally, the controller 52 may be used to create 104 a force profile based on the measured pressure. The force profile may be used by the controller 52 to monitor crimp quality. For example, the force profile may be analyzed, as previously described, to determine if a particular crimp is defective.

Figure 6:
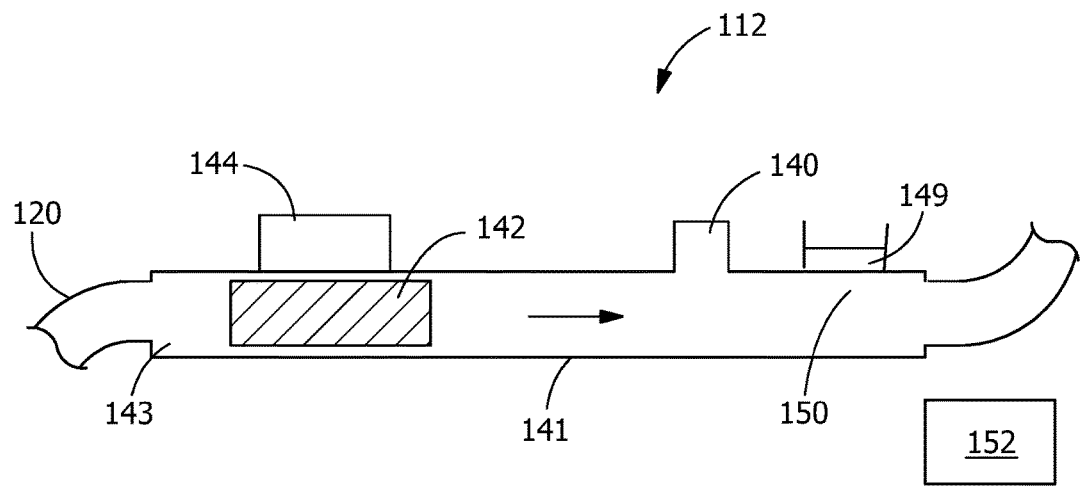
FIG. 6 illustrates a second illustrative embodiment of a device for monitoring the crimp quality for a hydraulic crimping apparatus.

A second illustrative embodiment of a crimp quality monitory system 112 in a hydraulic delivery system 120 is shown in FIG. 6. The crimp quality monitory system 112 provides a simple analog method of measuring the amount of hydraulic fluid that has is pumped through the hydraulic delivery system 120. The crimp quality monitory system 112 includes one or more tubes 141 to measure or gauge the amount of force that is in the hydraulic lines and the amount of fluid displacement which is required to move the crimp tooling.

Each tube 141 has a plunger 142 movably positioned inside the tube 141. The plunger 142 is movable or slideable along the length of the tube 141. The movement of the plunger 142 is proportional to the amount of fluid that enters one end 143 of the tube 141. The area of the inside of the tube 141, which the hydraulic fluid must pass through to reach the face of the plunger 142, is constant. Therefore, assuming that there is a set initial location of the plunger 142, by monitoring and measuring the movement of the plunger 142 in the tube 141, the volume of the fluid entering the tube 141 may be calculated by multiplying the area of the inside of the tube by the length of movement of the plunger. A displacement sensor 144 may be used to monitor the displacement of the plunger 142. As the hydraulic system 120 is a closed system and the hydraulic fluid is not compressible, the volume of fluid which enters the end 143 of the tube 141 and causes the plunger 142 to be displaced, is directly proportional to the amount of fluid which enters or exists the hydraulic head. Therefore, any movement of the plunger 142 is directly proportional to a change in the displacement of the second die half of the crimp tooling.

A pressure monitor 140 of the type that converts pressure into an analog electrical signal, such as, but not limited to, a strain-gage based transducer is also provided on the tube 141. The conversion of the pressure into an electrical signal is achieved by the physical deformation of strain gage which is bonded into the diaphragm of the pressure transducer and wired into a Wheatstone bridge configuration. Consequently, pressure applied to the pressure transducer produces a deflection of the diaphragm which introduces strain to the gage. This strain produces an electrical resistance change proportional to the pressure. As the hydraulic system 120 is a closed system and the hydraulic fluid is not compressible, the pressure in the tube 141 is proportional to the pressure applied to the hydraulic head, and proportion to the force applied to the terminal and wire being crimped. Therefore, the signal transmitted from the pressure monitor 40 is indicative of the force imposed upon the terminal during crimping.

The displacement sensor 144 and pressure monitor 140 send information to a controller or microprocessor 152. A wired or wireless electrical connection between the pressure monitor 140 and the controller 152 may be provided. Similarly, a wired or wireless electrical connection between the displacement sensor 144 and the controller 152 may be provided.

In this embodiment, a system to bleed air from the tube 141 may be provided. If air is introduced into the system 120, absent a means to release the air, the air may remain trapped in the system, thereby preventing or inhibiting the operation of the plunger 142. In order to allow air to be removed from the system 120, the system to bleed air from the tube 141 includes a set of protocols to bleed the line when required. The system applies pressure to a valve 149 in the tube 141, parallel to the sides of the tube 141, which along with proper orientation of attached hoses causes air to collect in a certain defined area 150. Opening the valve 149 while continuing to add pressure forces the air out of the system.

Figure 7:
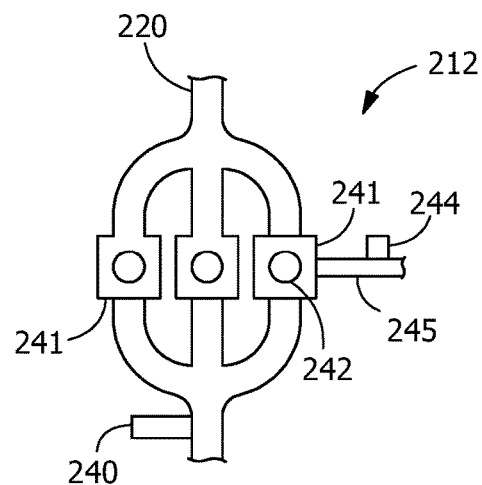
FIG. 7 illustrates a third illustrative embodiment of a device for monitoring the crimp quality for a hydraulic crimping apparatus.

A third illustrative embodiment of a crimp quality monitory system 212 in a hydraulic delivery system 220 is shown in FIG. 7. In this embodiment, three cylinders 241 and pistons 242 are mated together and have hydraulic fluid running therethrough. Solenoid controlled high pressure valves (not shown) are provided to control the hydraulic fluid movement in and out of each cylinder 241. A crankshaft 245 connects all pistons 242 together. The pistons 242 are offset 120 degrees from each other in order to maintain a constant power output. The hydraulic delivery system 220 uses a two stroke design with intake and exhaust only.

As the pistons 242 are offset 120 degrees, there will be some overlap, but for ease of explanation and understanding, the operation of only one piston 242 will be provided. Initially, the solenoid controlled valves are opened to allow for fluid to enter the cylinder 241. When fluid begins to fill the cylinder 241, the piston 242 is in its highest position, similar to where the intake stroke of an engine would be. The pressure of the cylinder 241 is used to move the crankshaft 245 where the other pistons are connected to so that is process is occurring in all three cylinders but at different times. Once the piston 242 has reached its lowest point the valves that are allowing fluid to enter close and the valves that allow fluid to exit are opened. As this occurs, the power of another piston 242 being filled and the fluid pushing down that piston 242 will force this piston 242 in this cylinder 241 to move upwards, displacing the fluid out of the cylinder 241 and toward the crimp tooling. In order to convert piston movement to volumetric flow a meter 244 would be required count the number of times the crankshaft rotates. The number of rotations is multiplied by the volume of each cylinder to provide the volume of fluid that is displaced. Similar to the other designs a high-pressure monitor 240 is provided after the volumetric flow meter 244 to measure or gauge the pressure of the fluid that is being transmitted to the crimp tooling.

Figure 8:
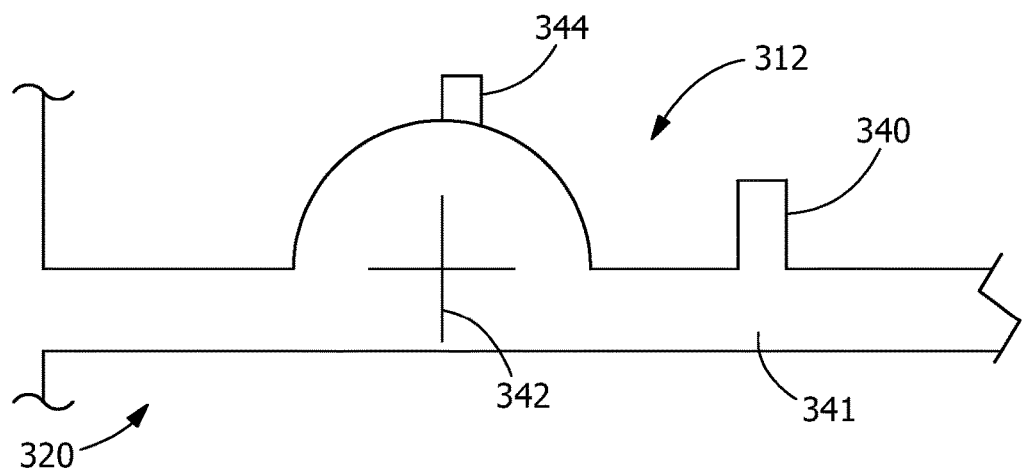
FIG. 8 illustrates a fourth illustrative embodiment of a device for monitoring the crimp quality for a hydraulic crimping apparatus.

A fourth illustrative embodiment of a crimp quality monitory system 312 in a hydraulic delivery system 320 is shown in FIG. 8. A pipe 341 has a pinwheel 342 that is placed transverse to flow of hydraulic fluid. The volumetric flow meter 344 records the number of times that the pinwheel 342 is rotated, allowing the amount of fluid that has passed through the system 320 to be counted. Similar to the other designs, a high-pressure monitor 340 is provided after the volumetric flow meter 344 to measure or gauge the pressure of the fluid that is being transmitted to the crimp tooling.

Figure 9:
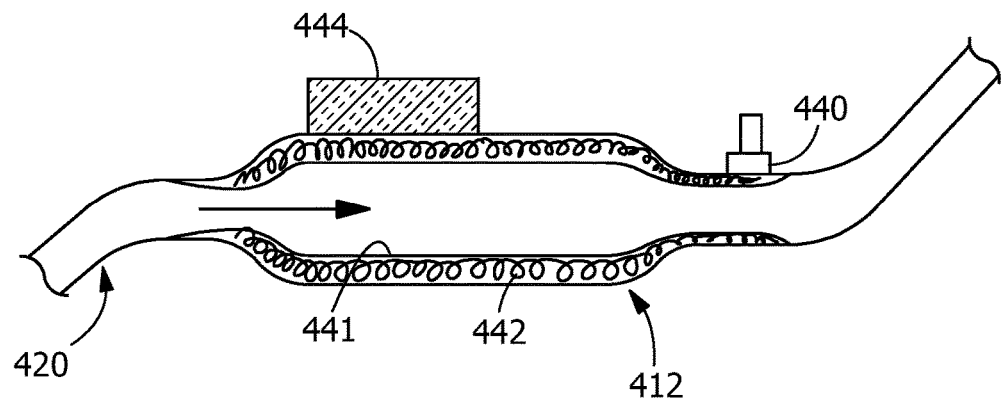
FIG. 9 illustrates a fifth illustrative embodiment of a device for monitoring the crimp quality for a hydraulic crimping apparatus.

A fifth illustrative embodiment of a crimp quality monitory system 412 in a hydraulic delivery system 420 is shown in FIG. 9. In this embodiment, the hydraulic fluid is ferromagnetic or to has a magnetic additive. The flow meter 444 controls the amount of fluid that passes through a specific cross section of the pipe 441. Wires 442 are wrapped around the pipe 441 where the fluid is passing underneath. As the fluid is magnetic, the movement of the fluid will create a moving B field (flux) that will cause a current to form in the wires 442. The current is measured and converted into a volumetric displacement. In various embodiments, voltage spikes associated with the flow of the magnetic fluid could be measured and recorded, allowing a secondary means of measuring the amount of fluid that has passed through the system. Similar to the other designs, there will be a high-pressure monitor 440 provided after the volumetric flow meter 444 to measure or gauge the pressure of the fluid that is being transmitted to the crimp tooling.

Figure 10:
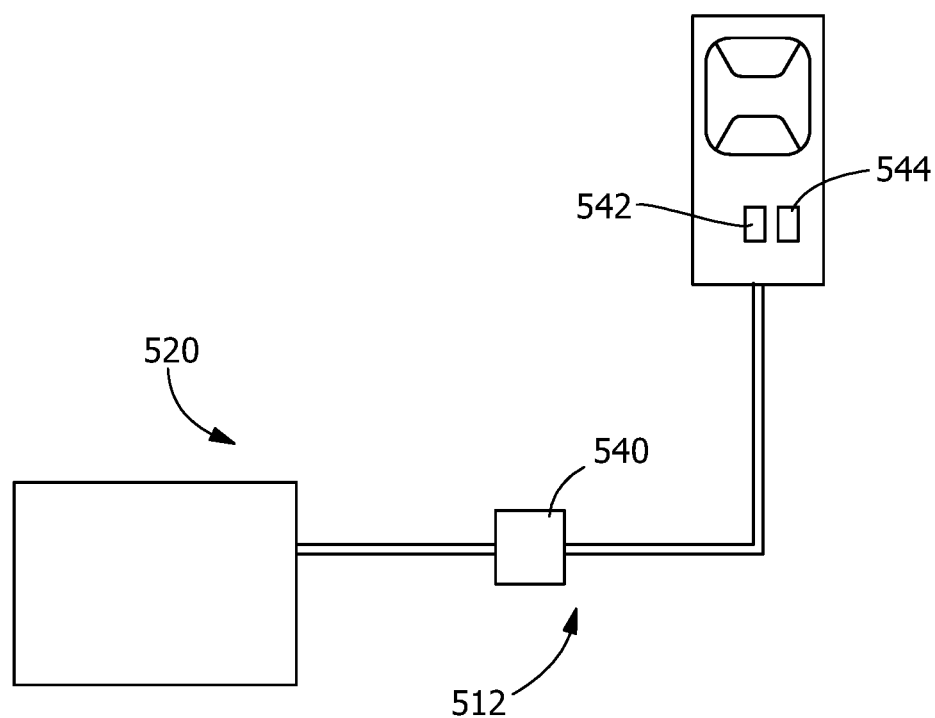
FIG. 10 illustrates a sixth illustrative embodiment of a device for monitoring the crimp quality for a hydraulic crimping apparatus.

A sixth illustrative embodiment of a crimp quality monitory system 512 in a hydraulic delivery system 520 is shown in FIG. 10. In this embodiment, a sensor 544 is positioned on or monitors a button 542 which the operator engages allows the hydraulic fluid to flow to the crimp tooling. The sensor 544 monitors the time the button 542 is engaged, allowing the amount of fluid flowing to the crimp tooling to be calculated. Similar to the other designs a high-pressure monitor 540 is provided to measure or gauge the pressure of the fluid that is being transmitted to the crimp tooling. By monitoring both the pressure and the time, the controller can determine if the crimp was good or bad.

In a seventh illustrative embodiment of a crimp quality monitory system, the quality of the crimp may be measured by time. In this embodiment, the time required for the hydraulic head to be moved from a first position to a second position is timed. The measured time is compared to a range of targeted times that have been established and which represents the time required for a proper crimp to occur. If the measured time is positioned between the target times, a visual output is provided to the operator to indicate that the terminal is properly crimped to the wires. If the measured time is outside of the target times, a visual output is provided to the operator to indicate that the terminal is not properly crimped to the wires. In one illustrative embodiment, the measurement of the time may begin when a targeted low pressure is reached in the hydraulic system and may end when a targeted high pressure is reached in the hydraulic system. In another illustrative embodiment, the measurement of the time may begin when a targeted initial flow rate is reached in the hydraulic system and may end when a targeted final flow rate is reached in the hydraulic system.

An eight illustrative embodiment of a crimp quality monitory system monitors the flow of the fluid by counting the number of strokes of a piston, located in the hydraulic pump. The piston is provided to pump or displace the fluid out of the hydraulic pump and toward the crimp tooling. In order to convert piston movement to volumetric flow a meter is provided count the number of cycles of the piston. The number of cycles is multiplied by the volume of the cylinder to provide the volume of fluid that is displaced. Similar to the other designs a high-pressure monitor is provided to measure or gauge the pressure of the fluid that is being transmitted to the crimp tooling. Alternatively, the pressure monitor may be used to calculate the number of cycles eliminating the need for the counting meter. As the piston cycles, pulses in the pressure of the hydraulic fluid occurs. Therefore, the pressure monitor can also be used to count the number of peaks in the pressure of the hydraulic system which would correlate to the number of cycles of the piston.

The method of monitoring crimp quality of the crimp terminal in the hydraulic crimping apparatus of the various embodiment may include measuring: a) a pressure of a hydraulic fluid in a hydraulic system supplied to a hydraulic crimping head of the hydraulic crimping apparatus; or b) a flow rate of the hydraulic fluid supplied in the hydraulic system to the hydraulic crimping head of the hydraulic crimping apparatus; or c) the time required to move the hydraulic crimping head from a first position to a second position; or d) any combination of a), b) or c). The method may also include analyzing the measured pressure, flow rate, time or any combination thereof to a respective pressure, flow rate or time to determine if a crimp is defective or not defective. While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A method of monitoring crimp quality in a hydraulic crimping apparatus, the method comprising:
   measuring, at a location remote from a hydraulic crimping head of a the hydraulic crimping apparatus, a pressure of hydraulic fluid supplied to a hydraulic crimping head of the hydraulic crimping apparatus;
   providing the measured pressure of the hydraulic fluid to a controller;
   measuring, at a location remote from a hydraulic crimping head of the hydraulic crimping apparatus, a flow of the hydraulic fluid supplied to the hydraulic crimping head of the hydraulic crimping apparatus;
   providing the measured flow of the hydraulic fluid to the controller;
   analyzing the pressure and the flow of the hydraulic fluid;
   plotting the pressure and flow of the hydraulic fluid during a crimp cycle and comparing the plot to a first targeted crimping force envelope and a second targeted crimping force envelope to determine if a crimp is defective by determining if the plot is outside of an area between the first targeted crimping force envelope and the second targeted crimping force envelope.

2. The method of claim 1, wherein the measuring includes measuring the pressure and the flow at predetermined intervals.

3. The method of claim 1, further comprising supplying the hydraulic fluid to the hydraulic crimping apparatus from a hydraulic pump which connects to the hydraulic crimping apparatus through a closed system.

4. The method of claim 3, wherein the pressure of the hydraulic fluid supplied to the hydraulic crimping head of the hydraulic crimping apparatus is proportional to a force applied to a terminal being crimped by the hydraulic crimping head of the hydraulic crimping apparatus.

5. The method of claim 3, wherein the flow of the hydraulic fluid supplied to the hydraulic crimping head of the hydraulic crimping apparatus is proportional to a displacement of a terminal being crimped by the hydraulic crimping head of the hydraulic crimping apparatus.

6. The method of claim 1, further comprising providing a visual indication to an operator of the hydraulic crimping apparatus if the crimp is defective or not defective.

7. A system for monitoring the crimp quality for a hydraulic crimping apparatus, the system comprising:
   a hydraulic pump connected to crimp tooling;
   a pressure sensor provided between the hydraulic pump and the crimp tooling, the pressure sensor measures the pressure of the hydraulic fluid in the system;
   a flow sensor provided between the hydraulic pump and the crimp tooling, the flow sensor measures the flow of hydraulic fluid in the system;
   a controller plots the pressure of the hydraulic fluid provided by the pressure sensor and the flow of the hydraulic fluid provided by the flow sensor and compares the plots to a first targeted crimping force envelope and a second targeted crimping force envelope to determine if a crimp is defective by determining if the plot is outside of an area between the first targeted crimping force envelope and the second targeted crimping force envelope.

8. The system as recited in claim 7, wherein the pressure of the hydraulic fluid in the system monitored by the pressure sensor is proportional to a pressure applied to a die half of a crimp tooling of the crimping apparatus.

9. The system as recited in claim 7, wherein the flow of the hydraulic fluid in the system monitored by the flow sensor is proportional to a displacement of a die half of a crimp tooling of the crimping apparatus.

10. The system as recited in claim 7, wherein the pressure sensor is a pressure transducer which converts the pressure of the hydraulic fluid in the system to an analog electrical signal.

11. The system as recited in claim 7, wherein the flow sensor includes a flow meter which measures the volumetric flow of the hydraulic fluid in the system.

12. The system as recited in claim 7, wherein the flow sensor includes a moveable device which is positioned in the system and which is moved as the flow of the hydraulic fluid in the system changes.

13. The system as recited in claim 7, wherein the hydraulic fluid has magnetic properties and the flow sensor measures the moving flux field created by the movement of the hydraulic fluid.

\* \* \* \* \*